Jan. 21, 1964　　H. C. SWIFT　　3,118,518
INTERNALLY EXPANDING VEHICLE BRAKE
Filed June 13, 1962　　2 Sheets-Sheet 1

INVENTOR.
Harvey C. Swift
BY
Harness, Dickey & Pierce
ATTORNEYS

Jan. 21, 1964　　　　　　H. C. SWIFT　　　　　　3,118,518
INTERNALLY EXPANDING VEHICLE BRAKE
Filed June 13, 1962　　　　　　　　　　　　2 Sheets-Sheet 2
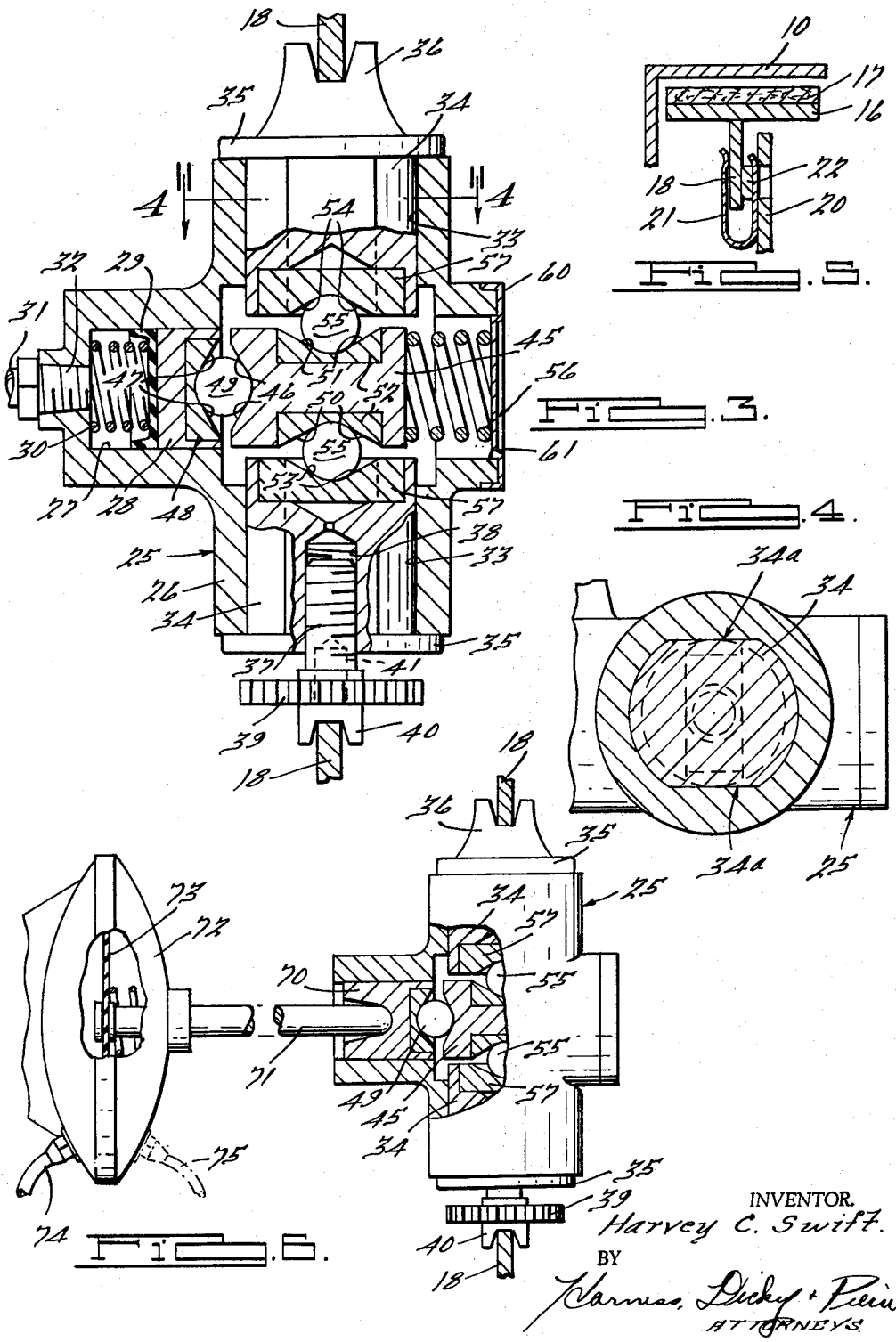
INVENTOR.
Harvey C. Swift.
BY
Harness, Dickey + Pierce
ATTORNEYS United States Patent Office 3,118,518
Patented Jan. 21, 1964

3,118,518
INTERNALLY EXPANDING VEHICLE BRAKE
Harvey C. Swift, Birmingham, Mich., assignor to Kelsey-Hayes Company, Romulus, Mich., a corporation of Delaware
Filed June 13, 1962, Ser. No. 202,315
4 Claims. (Cl. 188—78)

This invention relates to vehicle brakes and particularly to heavy duty brakes adapted for use on trucks, trailers and other heavy vehicles.

In prior art brake constructions involving a pair of interconnected brake shoes, the heavy work load imposed on the shoes caused excessive wear on one of the brake shoes, so that in time the unequal wear on the shoes resulted in improper and inefficient operation of the brake.

It is therefore a principal object of this invention to provide a brake construction adapted for heavy duty performance and comprising a pair of independently operable brake shoes and two brake cylinders each including a mechanical equalizer, said brake cylinders being arranged between both adjacent ends of the shoes. With such a construction, each brake shoe is moved independently and equally into uniform engagement with the brake drum upon application of the brake, and unequal wear between the shoes is eliminated.

Also in accordance with this invention, the mechanical equalizers are designed so as to permit limited circumferential movement of the brake shoes upon engagement with the drum. This automatically increases the pressure of the shoes against the drum and produces what is known as a servo action or self-energization.

Another object of this invention is to provide a mechanical equalizer so designed that a mechanical advantage is obtained between the power input and the power or force applied to the brake shoes. This mechanical advantage is increased due to the mounting of the brake shoes which permits the shoes to become self-energized, thus resulting in a brake having a high torque output.

Another object of this invention is to provide a construction in which the brake cylinders incorporating the equalizers constitute the basic actuating elements for the brake and which in turn may be actuated by either hydraulic, air, or vacuum power means.

Further objects of the invention are to provide a device of this type which is highly efficient, durable, compact, and of simple construction, comprising a minimum number of parts, whereby it may be economically manufactured and easily assembled.

The various objects and advantages and the novel details of construction of the invention will become more apparent as this description proceeds, especially when considered in connection with the acompanying drawings, in which:

FIGURE 3 is an enlarged detail sectional view taken substantially on the plane indicated by line 3—3 in FIGURE 1;

FIGURE 4 is a detail sectional view taken substantially on the plane indicated by line 4—4 in FIGURE 3;

FIGURE 5 is a detail sectional view taken substantially on the plane indicated by line 5—5 in FIGURE 1; and FIGURE 6 is a sectional elevational view illustrating a modified form of power means for actuating the brake.

Figure 1:
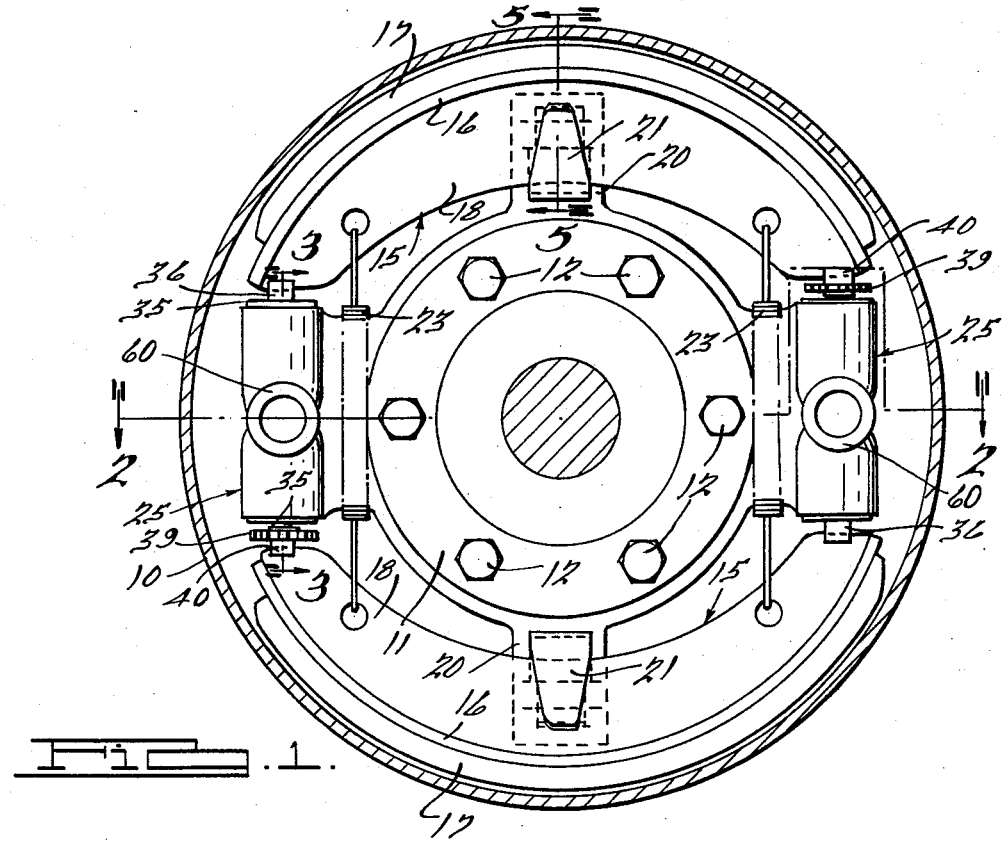
FIGURE 1 is a sectional elevational view of a brake incorporating features of this invention.

The illustrative embodiment of the invention is shown in the drawings as applied to a brake structure of the internal expanding type comprising arcuate brake shoes adapted to cooperate with the inner surface of a brake drum.

Figure 2:
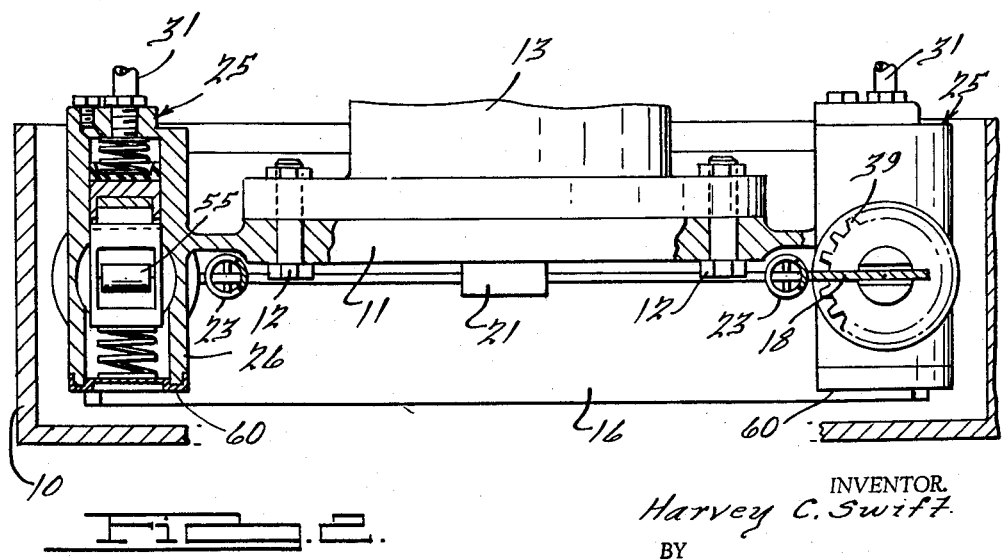
FIGURE 2 is a transverse sectional elevational view taken substantially on the plane indicated by line 2—2 in FIGURE 1.

In FIGURES 1 and 2, the reference character 10 indicates a brake drum that is mounted on the wheel hub (not shown) for rotation therewith. A stationary spider 11 is mounted by means of bolts 12 on a stationary part 13 of the vehicle, such as the axle housing.

The reference character 15 indicates a pair of identical independent brake shoes in the form of arcuate segments, each brake shoe being provided with an arcuate rim portion 16 supporting a lining 17. Each rim portion 16 is reinforced against flexure by a web portion 18 extending perpendicularly from the rim portions 16.

The stationary spider 11 is formed with a pair of opposed radially extending arms 20, upon each of which is mounted a spring clip 21 adapted to straddle the web 18 of the brake shoe 15 to guide the shoe in its movement toward and away from the brake drum 10 and to prevent lateral displacement of the brake shoe. Each spring clip 21 is substantially U-shaped in longitudinal section, with one leg of the U lying on each side of the web 18, as shown in FIGURE 5. For securing the U-shaped clip 21 in place, the material of the arm 20 is partially sheared and deformed outwardly to form a strap or loop 22 under which the inner leg of the U-shaped clip engages, as shown in FIGURE 5.

Interposed between both pairs of adjacent ends of the brake shoes 15 are wheel or brake cylinders indicated generally by the reference character 25. Each brake cylinder comprises a substantially T-shaped casing or housing 26, see particularly FIGURES 1, 2 and 3, formed integrally with the spider 11 on opposite sides thereof. The stem of the T-shaped casing is formed with a bore or cylinder 27 adapted to slidably receive a power piston 28. The piston is provided with a packing 29 and is urged to the right, as shown in FIGURE 3, by a spring 30, which also holds the packing 29 in place.

In the form of the invention illustrated in FIGURES 1 to 5, inclusive, the piston 28 is operated by hydraulic pressure supplied through a conduit 31 connected to the end of the cylinder 27 by a nipple 32. Both conduits 31 are connected to a common source (not shown) of a hydraulic medium under pressure.

Retraction springs 23 normally hold the ends of the brake shoes in engagement with the brake shoe actuating pistons, yet to be described.

The head of the T-shaped casing 26 is provided with a pair of opposed bores or cylinders 33 adapted to slidably receive brake shoe actuating pistons 34. Each piston 34 is provided with an annular collar 35 adapted to engage the adjacent ends of the casing 26 at the innermost end of the movement of the pistons 34. The brake shoe operating pistons 34, as well as the power piston 28, are trapezoidal in cross section to provide a pair of opposed straight, parallel sides, such as shown at 34a in FIGURE 4, engaging complementary surfaces in the cylinders 27 and 33, to prevent rotation of the pistons in their cylinders.

The piston 34, at one end of the brake cylinder 25, is provided with a bifurcated portion 36 engaging the brake shoe web 18. An adjusting device is interposed between the piston 34 and the brake shoe web 18 at the other end of the brake cylinder 25. This adjusting device consists of a threaded member 37 engaging a threaded recess 38 in the piston. The member 37 is connected to an adjusting wheel 39 by which the member 37 may be screwed into or backed out of the threaded recess 38 to adjust the adjacent end of the brake shoe. The web 18 of the brake shoe engages a bifurcated member 40 provided with a stud 41 having a swivel or rotatable connection with the end of the member 37. Thus, by rotating the adjusting wheel 39, the adjacent end of the brake shoe may be adjusted to take up the wear on the brake lining. The annular collar 35 adjacent the adjusting wheel 39, when engaged with the end of the casing 26, acts as an anchor for the end of the adjacent shoe.

It will be noted from FIGURE 3 that the axes of the brake shoe actuating pistons 34 are in alignment and are arranged at right angles to the axis of the power piston 28. Arranged for movement along the axis of the power piston 28, and intersecting the axes of the pistons 34, is an actuator ram 45. One end of the ram 45 is provided with oppositely inclined ramp surfaces 46 adapted to cooperate with complementary surfaces 47 formed on an insert 48 secured on the end of the piston 28. An elongated roller 49 is interposed between the ramp surfaces 46 and 47 to operatively connect the actuator ram to the piston 28 so that movement of the piston 28 will be transmitted to the actuator ram 45. It will also be understood that the roller 49 also permits relative bodily movement of the actuator ram 45 along the axes of the pistons 34 when the pistons are moved during the servo action or self-energization of the brake.

The actuator ram 45 is provided with opposed pairs of ramp surfaces 50 and 51 formed in inserts 52 secured thereto. The adjacent ends of the pistons 34 are provided with complementary ramp surfaces 53 and 54 formed in inserts 57 in the pistons 34. Interposed between these sets of ramp surfaces are elongated rollers 55.

It will be understood that when fluid pressure is applied to the piston 28 to move the same to the right, as viewed in FIGURE 3, the actuator ram 45 will be moved to the right against the action of a spring 56. During this movement of the actuator ram 45, the rollers 55 ride up on the opposed ramp surfaces to displace the pistons 34 outwardly to apply the brakes. With the pistons 34 moved outwardly, the collars 35 move away from the ends of the casing 26 so that the pistons 34 and ram 45 may move as a body during the servo action or self-energization of the brakes. As this wrapping action of the brake shoes takes place, the pistons 34 and the actuator ram 45 will be shifted until the collar 35 adjacent the adjusting wheel 39 engages the end of the casing 26 to form an anchor for the adjacent end of the brake shoe. As stated heretofore, this bodily movement of the pistons 34 and actuator ram 45 is permitted by reason of the roller 49, which, during this movement, rides up on its opposed ramp surfaces 46 and 47. This latter movement will further shift the actuator ram 45 to the right to apply additional movement to the brake shoes through the movement of the rollers 55 on their respective ramp surfaces. It will be apparent that each brake shoe 15 is independently mounted and separately actuated by one of the brake cylinders 25 so that the actuation of one shoe does not influence the actuation of the other; also, that the mechanical equalizer in each brake cylinder applies equal force to the adjacent ends of both shoes.

With the structure above described, a mechanical advantage is obtained between the input power at the piston 28 and the braking force of the shoes on the brake drum, the same being in the order of 1 to 4.

The spring 56 which engages the actuator ram 45, to normally urge it to the left as viewed in FIGURE 3, bears at its other end on a cap member 60 which closes an opening 61 in the casing 26 through which the piston 28 and its associated parts, the roller 49, the actuator ram 45, the rollers 55 and the spring 56, may all be inserted when the device is assembled.

The ramp surfaces 47, 50, 51, 53 and 54 are all shown as being formed in inserts which may be made of harder material than the associated structures so as to more readily resist wear. The rollers 49 and 55 are elongated to provide a line contact between the opposed ramp surfaces and normally lie in the bottom of the troughs formed by the opposed ramp surfaces in the manner illustrated in FIGURE 3. When the parts are at rest, the spring 39 maintains the piston 28 in engagement with the roller 49 and the spring 56 maintains the actuator ram 45 in its intermediate position intersecting the axes of the pistons 34.

In the embodiment of the invention thus far described, the power piston 28 is operated by hydraulic pressure supplied through conduit 31.

In FIGURE 6, the power piston is indicated by the reference character 70 and is shown as actuated by a plunger 71 adapted to be moved by a power unit 72. This power unit is of conventional type and comprises a diaphragm 73 to one side of which air under pressure may be admitted through an air conduit 74. However, the plunger might be operated by causing a vacuum on the other side of the diaphragm 73 through a vacuum conduit shown in dotted lines at 75.

From the foregoing, it will be seen that the basic unit of this invention consisting of the brake cylinder 25 comprising a mechanical equalizer may be operated by either hydraulic, air, or vacuum power means.

While a commercially practical embodiment of the invention, suitable for use with various types of power means, has been described and illustrated herein somewhat in detail, it will be understood that various changes may be made as may come within the purview of the accompanying claims.

What is claimed is:

1. A vehicle brake comprising a supporting spider connected to a stationary part of the vehicle, a pair of brake shoes independently mounted on said spider for movement relative thereto upon application of the brake, brake cylinders interposed between the adjacent ends of the brake shoes, each brake cylinder comprising, a power piston connected to a source of power, an actuator ram, a pair of oppositely inclined ramp surfaces on one end of said actuator ram, a pair of complementary ramp surfaces formed on the adjacent end of said power piston, a bearing member interposed between said ramp surfaces to operatively connect said power piston to said actuator ram, a pair of opposed brake shoe actuating pistons movable on an axis at right angles to the axis of movement of said ram, ramp surfaces on opposed sides of said ram, complementary ramp surfaces formed on the adjacent ends of said brake shoe actuating pistons, and bearing members between said latter ramp surfaces operatively connecting said ram to said brake shoe actuating pistons.

2. A vehicle brake comprising a supporting spider connected to a stationary part of the vehicle, a pair of brake shoes independently mounted on said spider for movement relative thereto upon application of the brake, brake cylinders interposed between the adjacent ends of the brake shoes, each brake cylinder comprising, a power piston connected to a source of power, an actuator ram, a pair of oppositely inclined ramp surfaces on one end of said actuator ram, a pair of complementary ramp surfaces formed on the adjacent end of said power piston, a bearing member interposed between said ramp surfaces to operatively connect said power piston to said actuator ram, a pair of opposed brake shoe actuating pistons movable on an axis at right angles to the axis of movement of said ram, a pair of oppositely inclined ramp surfaces on opposite sides of said ram, complementary ramp surfaces formed on the adjacent ends of said brake shoe actuating pistons, and bearing members between said latter ramp surfaces normally disposed at the juncture of said oppositely inclined ramp surfaces for operatively connecting said ram to said brake shoe actuating pistons.

3. A vehicle brake comprising a supporting spider connected to a stationary part of the vehicle, a pair of brake shoes independently mounted on said spider for movement relative thereto upon application of the brake, brake cylinders interposed between the adjacent ends of the brake shoes, each brake cylinder comprising, a power piston connected to a source of power, an actuator ram, a pair of oppositely inclined ramp surfaces on one end of said actuator ram, a pair of complementary ramp surfaces formed on the adjacent end of said power piston, a bearing member interposed between said ramp surfaces, said bearing member and ramp surfaces operatively connecting said power piston to said actuator ram for moving the ram longitudinally and for permitting lateral movement of said ram, said lateral movement causing a further longitudinal movement of said ram, a pair of opposed brake shoe actuating pistons movable on an axis at right angles to the principal axis of movement of said ram, ramp surfaces on opposite sides of said ram, complementary ramp surfaces formed on the adjacent ends of said brake shoe actuating pistons, and bearing members between said latter ramp surfaces operatively connecting said ram to said brake shoe actuating pistons for actuating the latter upon longitudinal movement of said ram.

4. A vehicle brake comprising a supporting spider connected to a stationary part of the vehicle, a pair of brake shoes independently mounted on said spider for movement relative thereto upon application of the brake, brake cylinders interposed between the adjacent ends of the brake shoes, each brake cylinder comprising, a power piston connected to a source of power, an actuator ram bodily movable longitudinally and laterally, a pair of oppositely inclined ramp surfaces on one end of said actuator ram, a pair of complementary ramp surfaces on the adjacent end of said power piston, a bearing member interposed between said ramp surfaces for operatively connecting said power piston to said actuator ram for moving the ram longitudinally and for permitting lateral movement of said ram, a pair of opposed brake shoe actuating pistons, ramp surfaces on opposite sides of said ram, complementary ramp surfaces on the adjacent ends of said brake shoe actuating pistons, and bearing members between said latter ramp surfaces operatively connecting said ram to said brake shoe actuating pistons, said ram and brake shoe actuating pistons being movable as a body along the axis of said brake shoe actuating pistons during the self-energization of the brake shoes, said lateral movement of said ram causing a further longitudinal movement of said ram to further actuate said brake shoe actuating pistons.

References Cited in the file of this patent

UNITED STATES PATENTS

| | | |
|---|---|---|
| 1,980,611 | Brisson | Nov. 13, 1934 |
| 2,418,848 | Perrot | Apr. 15, 1947 |
| 2,527,126 | Goepfrich et al. | Oct. 24, 1950 |
| 2,569,012 | Lauer | Sept. 25, 1951 |
| 2,757,640 | White | Aug. 6, 1956 |
| 3,037,584 | Cox et al. | June 5, 1962 |

FOREIGN PATENTS

| | | |
|---|---|---|
| 466,804 | Great Britain | June 7, 1937 |
| 525,328 | Great Britain | Aug. 26, 1940 |
| 542,885 | Great Britain | Jan. 30, 1942 |